Sept. 29, 1942.  L. ROBIN ET AL  2,297,166
FREE WHEELING MECHANISM
Filed April 21, 1939    5 Sheets-Sheet 5
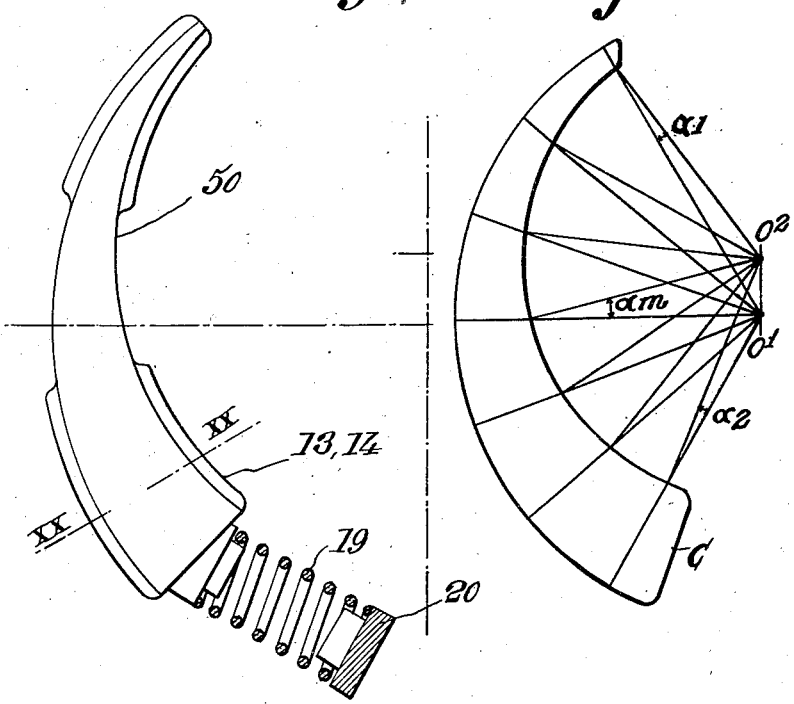
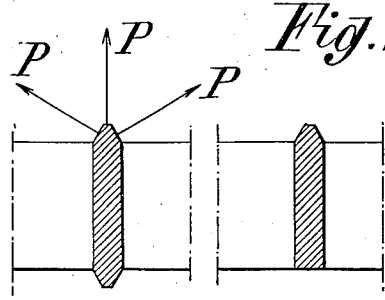
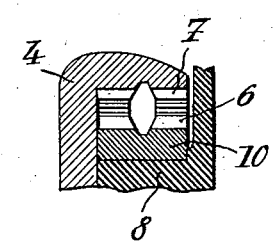
Inventors
Léo Robin,
Mathieu van Roggen,
Attorneys Patented Sept. 29, 1942

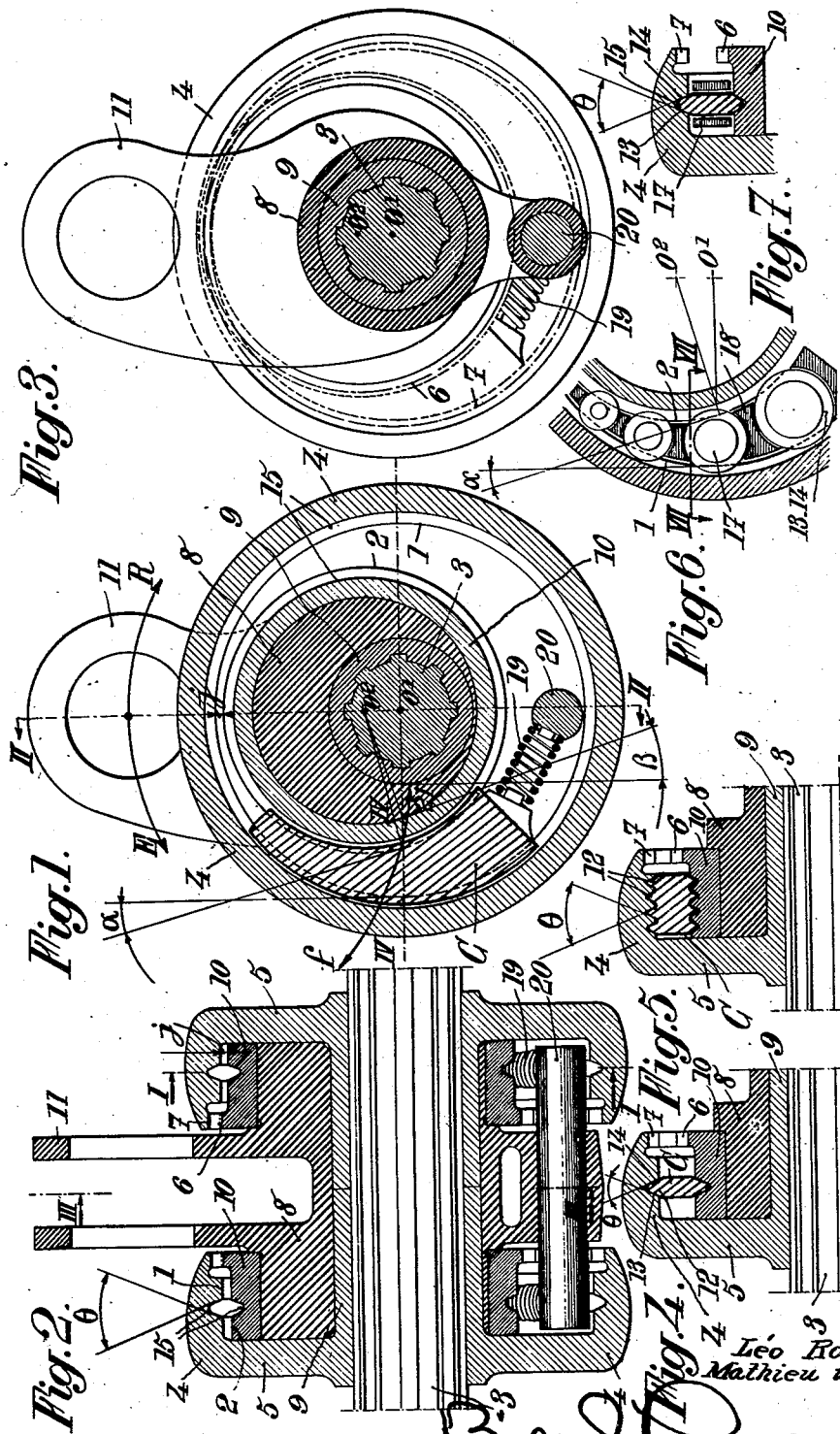

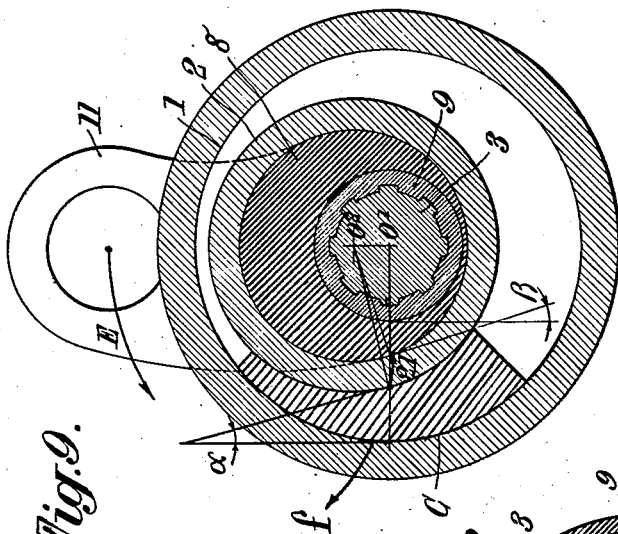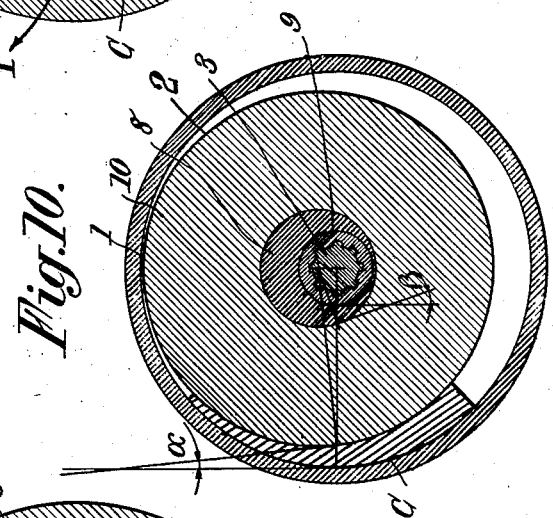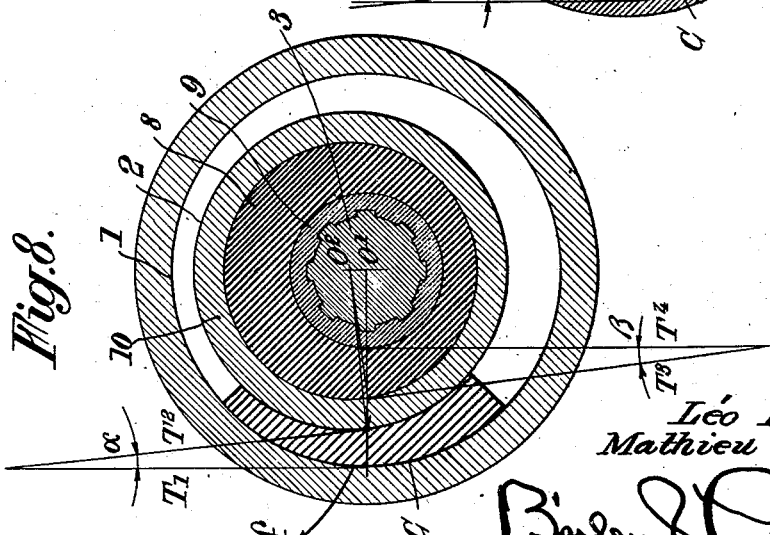

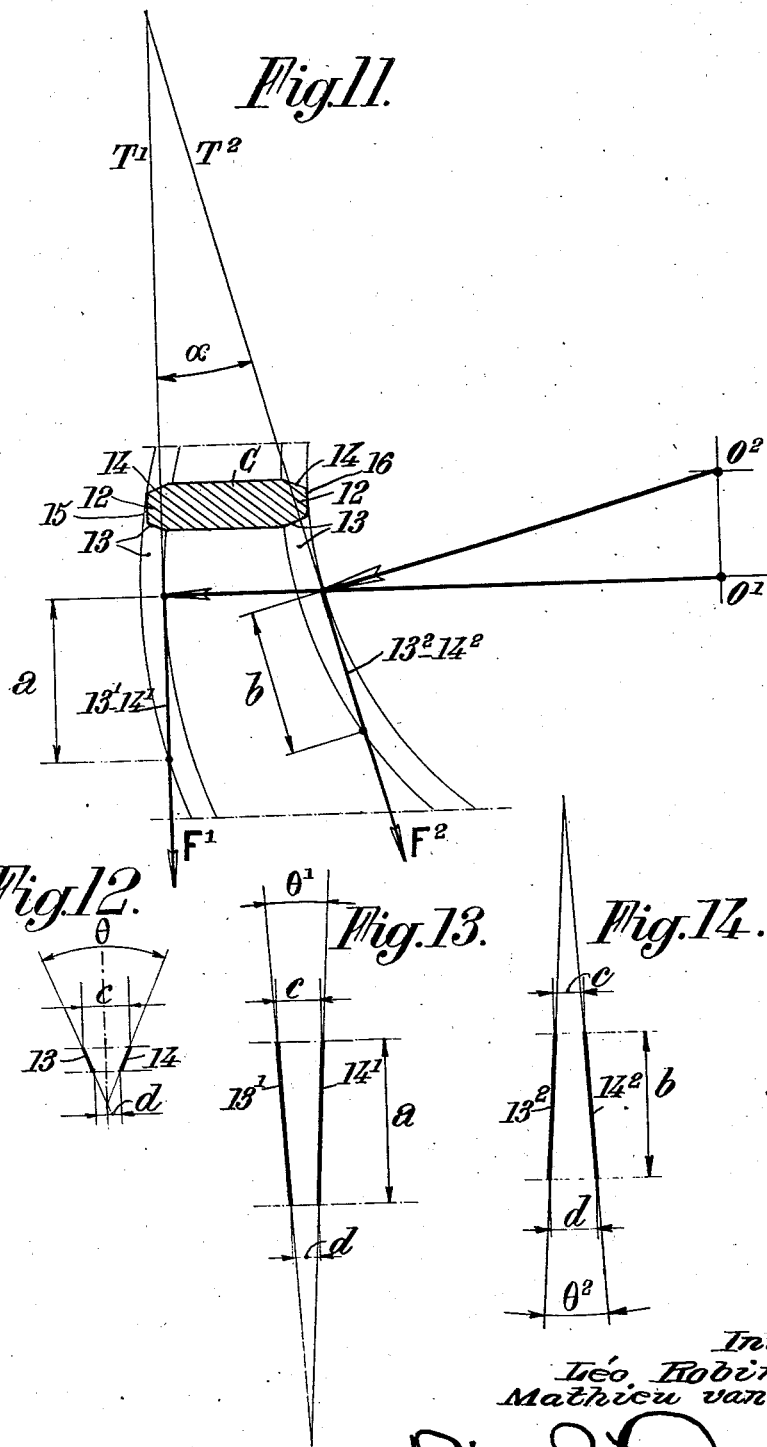

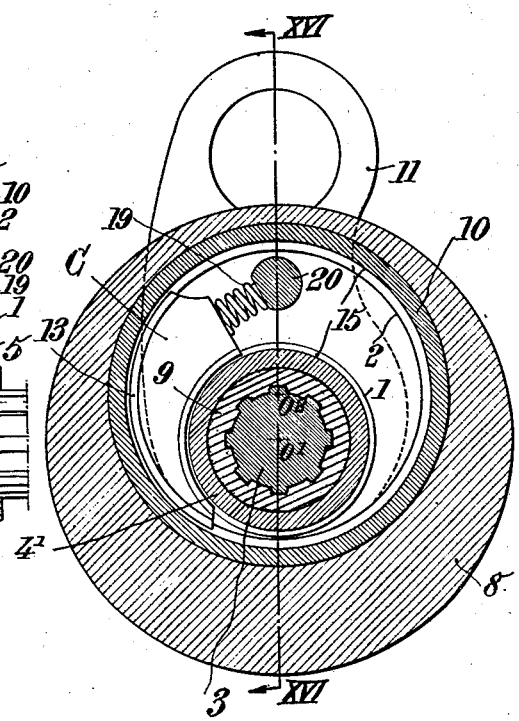
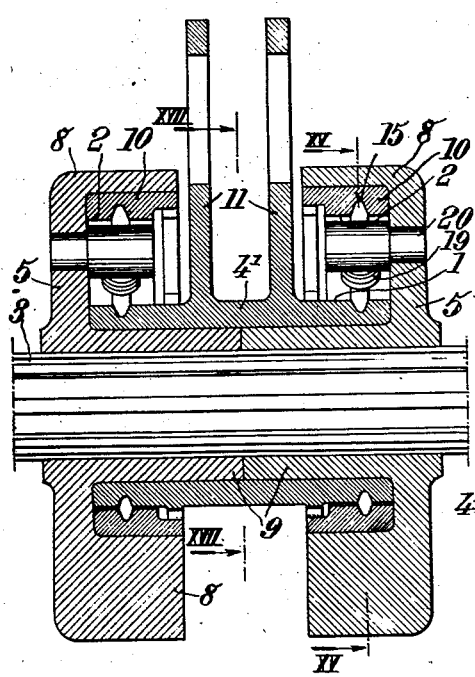
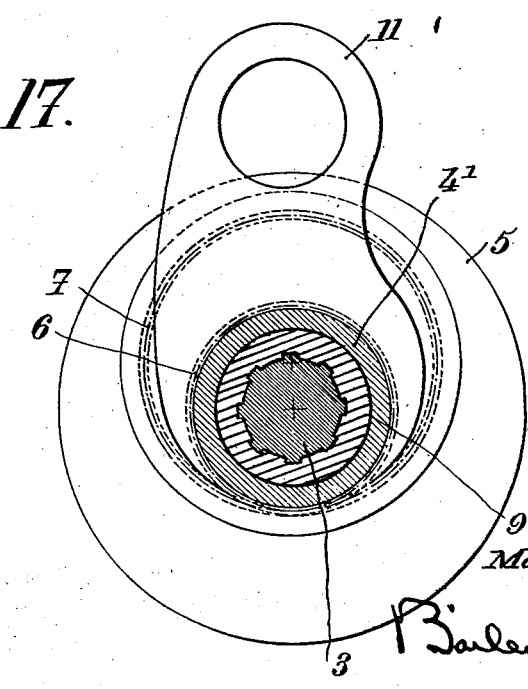

2,297,166

UNITED STATES PATENT OFFICE 2,297,166

FREE WHEELING MECHANISM

Leo Robin and Mathieu van Roggen, Sprimont, Belgium

Application April 21, 1939, Serial No. 269,255
In Belgium April 29, 1938

7 Claims. (Cl. 192—41)

The present invention relates to devices for causing at least two members to drive each other, such for instance as free wheel devices, these devices including, as set forth, for instance, in our Belgian patent application No. 412,403, filed Nov. 21, 1935, at least two surfaces capable of rolling with respect to each other, as opposed to a sliding displacement, under the effect of the relative movements to be imparted to said members, an obstacle being interposed between said surfaces in such manner that it can wedge them with respect to each other for one of the directions of rolling of said members with respect to each other, while it does not oppose the relative rolling in the other direction.

The object of the present invention is to provide a device of the type above described, which is better adapted to meet the requirements of practice than those used for the same purpose up to the present time, and in particular which ensures the wedging engagement of the parts under all working conditions, in particular under all conditions of lubrication, reciprocating speed, shocks, and so on.

According to an essential feature of the present invention, the devices of the kind above referred to are arranged in such manner, and, in particular, the above mentioned obstacle and the surface elements with which it cooperates are so shaped, that this obstacle can exert a wedging action in planes distinct from the planes of instantaneous rolling movement of said two surfaces.

Another feature of the present invention concerns the case of wedges the eccentricity of which varies along the rolling surfaces. This feature consists in arranging the device in such manner that the efforts which are to be produced by said wedges act chiefly, or even exclusively, upon only a portion of the surfaces, of the rolling parts, which cooperate with said wedges, preferably at places where the eccentricity, that is to say the wedging angle is smaller.

Still another feature of the present invention relates to devices of the type above described which include means, such as gears, for ensuring the positive and constant connection of the members having the cooperating rolling surfaces, and it consists in causing the obstacles to coact with the very surfaces of said means or with hollows or projections provided on said surfaces.

Still another feature of the present invention relates to devices of the type above set forth, and especially of the hypocycloid rolling type, including at least one obstacle constituted by a wedge of general curvilinear section corresponding to the diameters of the rolling surfaces, and this feature consists in arranging these devices in such manner that said wedge can exert, in the direction corresponding to the positive drive of the system, a correct wedging action without risking being expelled under the action of the driving force, in such manner that free wheel operation is ensured.

Still another feature of the present invention relates to devices of the type above referred to which include at least two rolling surfaces of circular sections of different respective diameters, forming a hypocycloidal device, the axis of one of these two rolling surfaces being adapted to turn about the axis of the other, and this feature consists in giving the largest diameter to the first of said surfaces (that is to say the surface the axis of which turns about the axis of the other) this first mentioned surface being preferably coupled with the driven portion of the device, whereas the second surface is, on the contrary, the driving portion.

Other features of the present invention will result from the following detailed description of some specific embodiments thereof.

Preferred embodiments of the present invention will be hereinafter described, with reference to the accompanying drawings, given merely by way of example, and in which:

Fig. 1 is a transverse sectional view, on the line I—I of Fig. 2, of a uni-directional driving device made according to the present invention;

Fig. 2 is an axial sectional view taken on the line II—II of Fig. 1;

Fig. 3 is a sectional view on the line III—III of Fig. 1;

Fig. 4 is a partial sectional view on the line IV—IV of Fig. 1;

Fig. 5 is a sectional view, analogous to Fig. 4, of a device of the same kind made according to a modification of the embodiment illustrated by Figs. 1 to 4;

Fig. 6 is a transverse sectional view of the device according to the invention, made according to another embodiment;

Fig. 7 is a partial axial section taken on line VII—VII of Fig. 6;

Fig. 8 is a transverse sectional view of a modification of the device according to the invention;

Fig. 9 illustrates the several elements shown in Fig. 8, in another position.

Fig. 10 illustrates a further modification of our invention;

Figs. 11 to 14 inclusive are diagrammatical views intended to show how the wedging, i. e. driving, conditions are obtained, in a device of the kind of that illustrated by Figs. 1 to 4, according to the invention;

Fig. 15 is a transverse sectional view on the line XV—XV of Fig. 16, of another embodiment of the device according to the present invention;

Fig. 16 is an axial sectional view taken on the line XVI—XVI of Fig. 15;

Fig. 17 is a transverse sectional view on the line XVII—XVII of Fig. 16;

Fig. 18 is a diagrammatical view illustrating the variation of eccentricity or wedging angle along the outline of a wedge for use in connection with a device according to the invention;

Fig. 19 is an elevational view of a similar wedge made according to another embodiment of the invention;

Fig. 20 is a sectional view on the line XX—XX of Fig. 19;

Fig. 21 is a view analogous to Fig. 20, relating to another embodiment;

Fig. 22 shows, in section, a driving device of the kind of that illustrated by Fig. 1, but made according to another embodiment of the present invention.

In the following detailed description with reference to the accompanying drawings, it will be assumed, for purposes of illustration, that the invention is applied to the construction of a unidirectional driving device intended, by way of non-limitative example, to be utilized for actuating a shaft with a variable gear ratio, through a change speed device of the kind including connecting rods, in which system, for instance, a reciprocating movement is transmitted to a crank pin.

Such a system essentially includes, in the known manner, at least two rolling surfaces or parts which are connected in a suitable manner with the two elements to be driven by one another. In the embodiment that is being considered, one of these elements is the driven shaft and the other one is a crank arm which turns about the same axis as this shaft. These rolling surfaces are arranged in such manner that they can roll with respect to each other, with a movement which can be either of the epicycloid type or of the hypocycloid type. This rolling relationship is accomplished without relative sticking between the surfaces, that is to say the movements of relative rotation of said surfaces are positively conjugated, as shown by means of gears.

In the examples shown, these rolling surfaces are two cylindrical surfaces, one of which is located inside the other and therefore is capable of rolling with a hypocyclid motion, the whole being devised in the following manner, as indicated in the above cited prior application:

The inner surface 1 of the larger diameter is concentric with the axis $O^1$ of the driven shaft 3, being carried by an annular part 5 rotated by said shaft;

The outer surface 2 of the inner part, which rotates about axis $O^2$, different from axis $O^1$, is caused to roll with respect to surface 1, with which it is connected through gears 6 and 7, the rolling movement corresponding, in particular, to a rotation of $O^2$ about $O^1$.

An obstacle, wedge C, is inserted between surfaces 1 and 2 in such manner as to oppose the relative rolling displacement of said surfaces with respect to each other for one direction of rolling (corresponding to the drive of one of the elements by the other) whereas, for the other direction of rolling, corresponding to free-wheel operation, said obstacle leaves this movement wholly free to take place.

The rotation of axis $O^2$ about axis $O^1$ is obtained by means of an eccentric piece 8 adapted to turn about the axis $O^1$ of shaft 3, and having a sleeve 9 rigid with plate 5 and on which is engaged a ring 10 the outer surface of which constitutes the above mentioned rolling surface 2.

In the drawings, it has been assumed that eccentric element 8 is rigid with a crank arm 11 connecting with the reciprocating element, in the application of the invention above considered, while plate 5 is a driven element. It should be well understood, however, that the inverse solution might be adopted, the devices of the type above mentioned being reversible. Also, it has been intended that the device be double, that is to say, include two conjugated plates 5 and also two eccentric members 8.

Referring particularly to the wedge C, and also the surfaces 1 and 2 which are to coact therewith, these elements are arranged in such manner, according to the invention, that the correct working of the device is ensured under all conditions of lubrication, reciprocating speeds, shocks, and so on.

For this purpose, we proceed in the following manner, whether the wedge be solid or hollow of curvilinear section corresponding to the two curvatures of surfaces 1 and 2. But it should be well understood that this application has no limitative character, as it may be seen by examining Figs. 6 and 7.

First, it should be noted that, in a device of the kind of that with which the present invention is concerned, as shown by Figs. 1 to 4, or by Fig. 8, including cylindrical surfaces 1 and 2, when making use of a solid or hollow wedge C of the smooth surface type, that is to cylindrical contact surfaces corresponding to the above mentioned surfaces 1 and 2, wedging, in the driving direction E of crank arm 11, can be obtained only if the wedging angle $\alpha$, formed by the tangents $T^1$, $T^2$ to the opposed surfaces of the wedge, and in particular in the middle part thereof, is equal to, or smaller than, a certain limit value which, for instance in the case of steel sliding on steel, averages 6°.

But, on the other hand, it is found that the value of this angle $\alpha$ influences the characteristics of the other pieces of the system. In particular, in the case of a drive through an eccentric, it is related to the value of angle $\beta$, which characterizes the eccentricity and is formed by tangents $T^3$ and $T^4$ (Fig. 8). If $\alpha$ is chosen equal to 5°, it is found that, if the whole, and especially the thickness of ring 10, is to be made of suitable size, the value of $\beta$ must be chosen close to that of $\alpha$, that is to say about 7° in the case that is being considered.

Now, this value of $\beta$ is too low, and it is not practical, because it leads to subjecting the eccentric means to considerable radial stresses. Consequently:

a. If the wedge is of the smooth surface type, the whole tends, for free wheel working (corresponding to the radial displacement of the crank arm in direction R), to remain wedged, so that an effort is necessary for releasing the wedge, which is detrimental to efficiency and silent working; and b. If, on the contrary, it is endeavoured to obviate this by providing the wedge with rollers, these rollers are very quickly destroyed, due to the stresses they undergo.

It would be desirable, in order to avoid these drawbacks, to obtain a value of angle $\beta$ averaging for instance from 15 to 20°.

The chief object of the present invention is to provide a device of the type above described which complies with the following double condition, to wit, on the one hand, that a suitable wedging angle is always reached when the device is transmitting motion (direction E), but that the passage to free wheel working (direction R) takes place without any stress or shock.

In the case of smooth wedges, this double condition can be complied with, when the movement is transmitted through cams, only by giving ring 10 a considerable thickness. Such a solution is illustrated by Fig. 10, according to which, starting from an angle $\beta$ of sufficiently high value, this thickness is increased until angle $\alpha$ is reduced to its limit value.

This solution, which complies with the conditions above set forth, generally necessitates an exaggerate size and weight, which cannot be employed in the case of relatively high reciprocating velocities of the parts.

In order to comply with the double condition above stated, without involving too considerable an increase of the size of the parts, and in particular of the thickness of ring 10, we increase the wedging effect by arranging the whole in such manner that this effect which, in existing devices, took place only in the planes of instantaneous rolling movement of the two surfaces 1 and 2, can take place in different planes, and, in particular, in planes at right angles to said rolling planes.

It suffices, in particular, according to this feature, to give the obstacle or wedge C, in section, an angularity $\theta$ in radial planes, as shown by Figs. 4 and 11.

According to the invention, the arrangement is such that neither angle $\theta$ nor angle $\alpha$, as above defined, correspond to wedging values, but produce, by being combined together, a wedging action, particularly in planes perpendicular to the general rolling plane, as it will be hereinafter explained.

On the other hand, it should be well understood that this supplementary angularity can be provided either with respect to both of the rolling surfaces 1 and 2 of the driving device (as shown by Figs. 1 to 4, 7, 15 to 17, and 19–20), or with respect to only one of these two surfaces (as shown by Fig. 21), or alternately one and the other, at least over certain portions thereof, or again simultaneously with one or the other of the two arrangements above mentioned.

Referring first to an arrangement of the kind of that described by Figs. 1 to 4, this device is so designed that angle $\beta$ is sufficiently high, averaging for instance 20° (Fig. 9).

There follows for angle $\alpha$ a value averaging 17°, whereby, if use were made of an ordinary wedge C having smooth walls (Fig. 9) no wedging would be possible. For direction E, ring 10 would have a movement as shown by arrow F, but as angle $\alpha$ is too large, the wedge will necessarily be moved backward.

The whole of this device is then arranged in such manner that the contact between said wedge and at least one of the rolling surfaces can take place along portions of surfaces which make together, or with the general rolling plane, the above mentioned angularity $\theta$.

The wedge in one form is constituted by a solid piece, preferably flattened in the direction of the rolling movement, which is provided, on the edges thereof which are opposite surfaces 1 and 2 (said edges having general rectilinear shapes corresponding to the curvature of the above mentioned surfaces 1 and 2), with at least one projection 12 (having chamfered sides 13 and 14, of the same or of different inclinations) intended to come into contact with the inclined sides of corresponding grooves 15 provided in surfaces 1, 2 (Fig. 4), which grooves are such that, preferably, there is only contact between these chamfers and these sides.

Of course, an inverse arrangement might be used (groove on the wedge and projection on the corresponding rolling surface).

These chamfers 13, 14 preferably lead to an edge of rectilinear or other section 16 and of a width $d$ corresponding in a suitable manner with the thickness $c$ of the wedge (Fig. 12).

In Fig. 5, we have illustrated an embodiment in which several projections of grooves are provided.

Concerning the angularity $\theta$ of said chamfers or sides, which is defined, in the drawings, by the section by a radial plane (Figs. 11 and 12) we may for instance choose a value averaging 40° or more (for instance 60°, as hereinafter indicated) such an angle having no wedging property in itself, which is an important condition, since the wedge must be capable of moving along surfaces 1 and 2 every time the device is working in a free-wheel manner, for which the movements of the wedge are circular by tangential impulse.

Besides, it should be well understood that these inclined chamfers or sides can be arranged in a discontinuous manner. They might in particular be provided on rollers 17 (Figs. 6 and 7) carried by a cage 18, or on any other member intended to act as an obstacle with respect to surfaces 1 and 2.

These last mentioned surfaces will preferably be such that a suitable play $j$ is left between them (Fig. 1) especially with a view to facilitating lubrication.

Finally, the whole is completed by means, of a known type, tending to maintain in position the obstacle or wedge C, said means including, in the examples given, a spring 19 interposed between the wedge and a support or axis 20 rigid, in the embodiment of Figs. 1 to 4, with member 11.

Means, such as those described in said prior patent, might also be provided for bringing the wedge out of action when so desired.

Whatever be the particular embodiment that is chosen, we obtain a device which works in the following manner:

When crank element 11 is moved in the direction of arrow E, ring 10 tends to jam the wedge in the direction of arrow $f$ (Fig. 9) and the movement of radial compression which is thus produced creates a resultant $F^2$ in the direction of tangent $T^2$ (Fig. 11).

This effort $F^2$ would tend to move the wedge in the backward direction, but, when considering the angle $\theta^2$ along which the sides 13, 14 are cut at $13^2$, $14^2$, by the normal plane of ejection passing through tangent $T^2$, it is found that (Fig. 14) this angle, which results from a combination of angles $\alpha$ and $\theta$, averages about 5°. Therefore this angle has a wedging effect, and it opposes ejection.

The same reasoning would be made for tangent $T^1$ (Fig. 13).

Therefore, despite the fact that neither angle $\alpha$ nor angle $\theta$ are of a wedging value, the wedging action is obtained for the direction of drive E.

Considering now the free wheel operation (direction R), ring 10 is driven with a movement along arrow 21 (Fig. 1), so that the opening of the wedge becomes greater and greater.

As, in this movement, there is no radial pressure exerted on the wedge, there can be no tangential resultant. On the other side, as, at this time, the wedge is pushed by pin 20, which is given a circular movement, there is, for this direction of movement, a mere circular or tangential movement, which cannot be opposed in any way, due to the fact that, on the one hand, angles $\alpha$ and $\theta$ are not of a wedging value, and, on the other hand, in the application that is considered, corresponding to the drive through an eccentric member, the angle $\beta$ chosen for this eccentric member is relatively great; therefore, the device acts in a perfect manner as a free wheel.

In this way, we obtain a unidirectional driving device which has the following chief advantages:

a. It works in the best possible manner, without noise and without difficulties of lubrication;

b. Its cost is relatively low, owing to the possibility of utilizing solid wedges, while up to the present time the difficulties they involve necessitate the use of rollers, which are more expensive.

The devices above described are sufficient in themselves for obtaining a good result but they may be combined with the following arrangements, given by way of example, and which may be used separately.

One of these features relates to the case of driving devices having obstacles constituted in particular by wedges, and it consists in arranging the efforts to which said obstacles or wedges are subjected in such manner that these efforts act chiefly, or even exclusively, on only some of their surfaces opposite rolling surfaces 1 and 2, preferably those where the eccentricity is minimum.

In order to show the advantage of such an arrangement, it must be considered first that, above (Fig. 1) we have considered the angle $\alpha$ corresponding to the middle point of the wedge, that is to say at the place where it is maximum ($\alpha_m$, Fig. 18). Now, this angle varies along the wedge, growing smaller and smaller toward the ends, where it is minimum ($\alpha_{1, 2}$, Fig. 18).

It will be readily understood that, if the wedge is for instance hollowed out in its middle part at 50 (Fig. 19), in the zone where $\alpha$ is maximum, the mean wedging angle of the wedge, for a given eccentricity is reduced, which ensures a better wedging action. Inversely, it is possible to modify the eccentricity, for a given value of the wedging.

In Figs. 18 and 19, we have considered an instance wherein the eccentricity is such that it gives for $\alpha_m$ a value of about 14°.

Of course, concerning the value to be chosen for angle $\alpha$, it can itself be modified, because it depends upon not only the eccentricity of the wedge but also its mean wedging angle, with respect to the cooperating surfaces.

For instance we may choose, for instance, an angle $\theta$ averaging 60°, as illustrated by Fig. 20.

In a general manner, it will be easy to determine the ratio to exist between angle $\alpha$ (mean value) and angle $\theta$, taking into account the fact that, considering the pressure P applied on a rolling surface in the plane of the wedge, it produces, on the surfaces opposite chamfers 13, 14, pressures $P^1$ and $P^2$ which add their effects to each other.

For instance, if $\theta$ is equal to 60°, $P^1$ and $P^2$ are equal to each other and also to P, so that the presence of the chamfers above referred to has for its effect to multiply the pressure proper by three, and the limit wedging angle can be trebled with respect to the value which should have been chosen in the absence of said chamfers.

Of course, calculation must also take into account the pressures exerted on the hub 9 and the eccentric member 8.

According to another feature of the present invention, instead of causing said obstacles or wedges to cooperate with rolling surfaces 1, 2 distinct from the driving means or gears 6, 7, said obstacles or wedges are combined with these gears which ensures, in particular, a perfect lubrication, without requiring the use of auxiliary lubricating elements. This feature is disclosed in the modification illustrated in Fig. 22.

If use is made of the chamfered wedges as above described, they are caused to move in notches 15 (or on projections) provided in the surfaces of said gears (Fig. 22). The lubricating oil thus penetrates laterally along the teeth of the latter.

Another feature of the present invention relates to the devices of the hypocycloid rolling type including a surface of revolution or a cylindrical surface the axis of which is caused to turn about a second surface of the same nature and of different diameter, and it consists in arranging the whole in such manner that the first of said surfaces surrounds the second, that is to say is of greater diameter.

In another example, using an eccentric drive, we proceed substantially in the same manner as disclosed by Figs. 1 to 4, with the difference that the eccentric member 8 is carried by plate 5 and that it is on the outside of ring 10 (Figs. 15 to 17). On the other hand, member 4 is replaced by a sleeve $4^1$ engaged for instance on sleeve 9. The obstacle, wedge C is connected to plate 5 through projection 20.

In Figs. 15 to 17, it has been also intended that the device be double, including two series of conjugated elements.

Furthermore, according to a preferred embodiment of the preceding arrangement, the driving force is applied to the element $4^1$ which carries surface 1, whereas the receiving element is eccentric piece 8.

In this way, we obtain a system which is particularly advantageous for the following reasons:

On the one hand, when applied to alternating drive systems, member 11 is rigid with a perfectly balanced piece, that is to say sleeve $4^1$, which reduces the inertia stresses; and On the other hand, obstacle C itself produces no effort of inertia, since it is driven in a continuous manner together with plate 5 and the receiving shaft.

It is clear that the inverse solution might be adopted (that is to say with member 11 driven in a continuous manner by plate 5 and sleeve $4^1$ connected to the receiver shaft).

In either case, ball bearings or roller bearings might, if necessary, be provided for ensuring the rolling between ring 10 and eccentric member 8, and also between other rotating surfaces of the whole.

In a general manner, while we have, in the above description, disclosed what we deem to be practical and efficient embodiments of the present invention, it should be well understood that we do not wish to be limited thereto as there might be changes made to the arrangement, disposition, and form of the parts without departing from the principle of the present invention as comprehended within the scope of the appended claims.

What we claim is:

1. In a device of the type described, two rotatable coupling elements comprising, respectively, a driving part and a driven part forming opposed arcuate surfaces, gearing connecting said parts whereby, upon relative rotation therebetween, to roll one surface with respect to the other, and obstacle means interposed between said surfaces and engageable therewith to provide freedom of rotation of said driving part relative to said driven part in one direction only, the mutually engageable portions of said obstacle means and the arcuate working surface of at least one of said parts being formed of at least one projection substantially wedge-shaped in cross section on one of said portions, the other of said portions being complementarily recessed, the wedge angle of said projection, measured radially of the last-mentioned arcuate working surface being greater than 6°, the wedge angle of said projection, measured tangentially of said last-mentioned arcuate working surface being less than 6°.

2. In a device of the type described, two rotatable coupling elements comprising, respectively, a driving part and a driven part forming opposed curved surfaces, gearing connecting said parts whereby, upon relative rotation therebetween, to roll one surface hypocycloidally with respect to the other, and self-locking obstacle means interposed between said surfaces to provide freedom of rotation of said driving part relative to said driven part in one direction only, said obstacle means being of curved form and having sides substantially complementary to the curved surfaces of said parts, respectively, the mutually engageable portions of said obstacle means and at least one of said parts being complementary and substantially trapezoidal in cross section providing inclined working faces on each of said portions, the angle between the inclined working faces on each member being less than 90° and greater than the angle which could effect a self-locking action between said portions, the angular relationship of the opposed faces on said obstacle means and both of said parts, respectively, being such as to effect a self-locking between said parts when said driving part is rotated in the opposite direction.

3. In a device of the type described, two rotatable coupling elements comprising, respectively, a driving part and a driven part forming opposed curved surfaces, gearing connecting said parts whereby, upon relative rotation therebetween, to roll one surface hypocycloidally with respect to the other, and obstacle means interposed between said surfaces providing freedom of rotation of said driving part relative to the driven part in one direction only, said obstacle means being, in section plane transverse to the axes of rotation of said elements, in the form of a curved wedge, at least a portion of the sides of said wedge being complementary to the curved surfaces of said parts, respectively, said obstacle means and at least one of said parts having complementary portions substantially wedge-shaped in section plane perpendicular to the first-mentioned plane providing inclined working faces, the angle between the tangents of said curved surfaces and the angle of inclination between said surfaces being insufficient to effect a self-locking action, said angles being such that, when said driving element is rotated in the opposite direction, the lines of force extending across the inter-engaging surfaces of said parts and obstacle means define an angle of such degree as to cause self-locking action between said parts and obstacle means.

4. In a device of the type described, two rotary elements comprising, respectively, a driving part and a driven part having opposed curved working surfaces, means mounting the axis of one part eccentrically with respect to the axis of the other, driving means on said one element, means mounting said drive means for movement concentric with respect to said axis of said other element, gearing connecting said parts whereby, upon relative rotation therebetween, to roll one surface with respect to the other hypocycloidally so that the axis of one element rotates about the axis of the other element, and obstacle means interposed between said surfaces to provide freedom of rotation of said driving part relative to said driven part in one direction only, the curved surface of said one element being of larger diameter than that of the other element and being formed of a ring rotatably mounted on said one element.

5. In a device of the type described, two rotary elements comprising, respectively, a driving part and a driven part having opposed curved working surfaces, means mounting the axis of one part eccentrically with respect to the axis of the other, gearing connecting said parts whereby, upon relative rotation therebetween, to roll one surface with respect to the other hypocycloidally so that the axis of one element rotates about the axis of the other element, and obstacle means interposed between said surfaces to provide freedom of rotation of said driving part relative to said driven part in one direction only, the curved surface of said one element being of larger diameter than that of the other element and being formed of a ring rotatably mounted on said one element, said one element being the driven part.

6. In a device of the type described, two rotatable elements comprising, respectively, a driving part and a driven part having opposed curved working surfaces, means mounting the axis of one part eccentrically with respect to the other, gearing connecting said parts whereby, upon relative rotation therebetween, to roll one surface with respect to the other hypocycloidally so that the axis of one element rotates about the axis of the other, and obstacle means interposed between said surfaces to provide freedom of rotation of said driving part relative to said driven part in one direction only and to be wedged between said parts upon rotation of said driving part in the other direction, said obstacle means comprising a curvilinear wedge having a middle portion and two end portions, the surfaces thereof being cut away in the middle portion whereby to provide working surfaces only at the end portions where the wedge angle thereof is less than at the middle portion.

7. In a device of the type described, a first coupling element having a first curved working surface, means mounting said element for rotation of said first curved working surface about a first axis, a second coupling element having a second curved working surface opposite the first working surface, means mounting said second coupling element for rotation of said second curved working surface about a second axis spaced from said first axis, obstacle means between said elements having surface portions mating, respectively, with said first and second curved working surfaces, the tangents of said first and second curved working surfaces, taken along a radius of said first axis, forming a first angle greater than an angle which would produce wedging of said obstacle means upon relative rotation of one of said elements in one direction, the mating surface portion of said obstacle means and at least one of said working surfaces being chamfered, in axial section, at an angle greater than an angle which would produce wedging of said obstacle means upon said relative rotation of one of said elements, the angle of said chamfer, in the direction of the tangent of the last-mentioned working surface being such as to effect wedging of said obstacle means upon said relative rotation.

LEO ROBIN.
MATHIEU van ROGGEN.